United States Patent [19]
Miyake et al.

[11] Patent Number: 5,787,226
[45] Date of Patent: Jul. 28, 1998

[54] RADIO-INTEGRATED VIDEO TAPE RECORDER (VTR)

[75] Inventors: Chieko Miyake, Chiba; Tadashi Kurita; Yoshihiro Ohta, both of Kanagawa, all of Japan

[73] Assignee: Sony Corporation, Tokyo, Japan

[21] Appl. No.: 573,995

[22] Filed: Dec. 18, 1995

[30] Foreign Application Priority Data

Dec. 21, 1994 [JP] Japan .................................. 6-317419

[51] Int. Cl.⁶ .................................................. H04N 5/76
[52] U.S. Cl. .................. 386/83; 386/96; 386/46
[58] Field of Search ........................ 358/335, 341, 358/343, 310; 348/729, 725, 836, 838; 360/18, 19.1, 331; 386/46, 83, 95, 96; H04N 5/76

[56] References Cited

U.S. PATENT DOCUMENTS

| | | | |
|---|---|---|---|
| 5,214,514 | 5/1993 | Haberkern | 358/335 |
| 5,488,409 | 1/1996 | Yuen et al. | 386/83 |

FOREIGN PATENT DOCUMENTS

| | | |
|---|---|---|
| A-0 424 653 | 2/1991 | European Pat. Off. |
| A-0 439 281 | 7/1991 | European Pat. Off. |
| A-0 499 893 | 8/1992 | European Pat. Off. |
| A-39 32 696 | 4/1990 | Germany |
| 2034995 | 6/1980 | United Kingdom |
| A-2 166 278 | 4/1986 | United Kingdom |

OTHER PUBLICATIONS

Patent Abstracts of Japan, vol. 13, No. 185 (P-865), 2 May 1989 & JP-A-01 013247 (Sharp Corp.), 18 Jan. 1989, abstract.

Patent Abstracts of Japan, vol. 13, No. 99 (E-724), 8 Mar. 1989 & JP-A053 274223 (Clarion Co., Ltd.), 11 Nov. 1988, abstract.

*Primary Examiner*—Thai Tran
*Assistant Examiner*—Huy Nguyen
*Attorney, Agent, or Firm*—Frommer Lawrence & Haug LLP; William S. Frommer

[57] ABSTRACT

In a radio-integrated video tape recorder (VTR) which comprises a radio tuner section for receiving radio broadcast programs and for outputting an audio signal corresponding to a selected one of the received programs, a character generator for producing a video signal, a VTR section for recording the output audio signal from the radio tuner section and the video signal from the character generator in related portions of a recording tape, and a microprocessor for controlling the radio tuner section, character generator and VTR; such microprocessor is operative, in a radio broadcast program recording mode, to provide situation data to the character generator which determines the video signal recorded by the VTR section and which includes time data and receiving data identifying the selected one of the radio broadcast programs to which the audio signal recorded in the related portion of the tape corresponds.

6 Claims, 5 Drawing Sheets

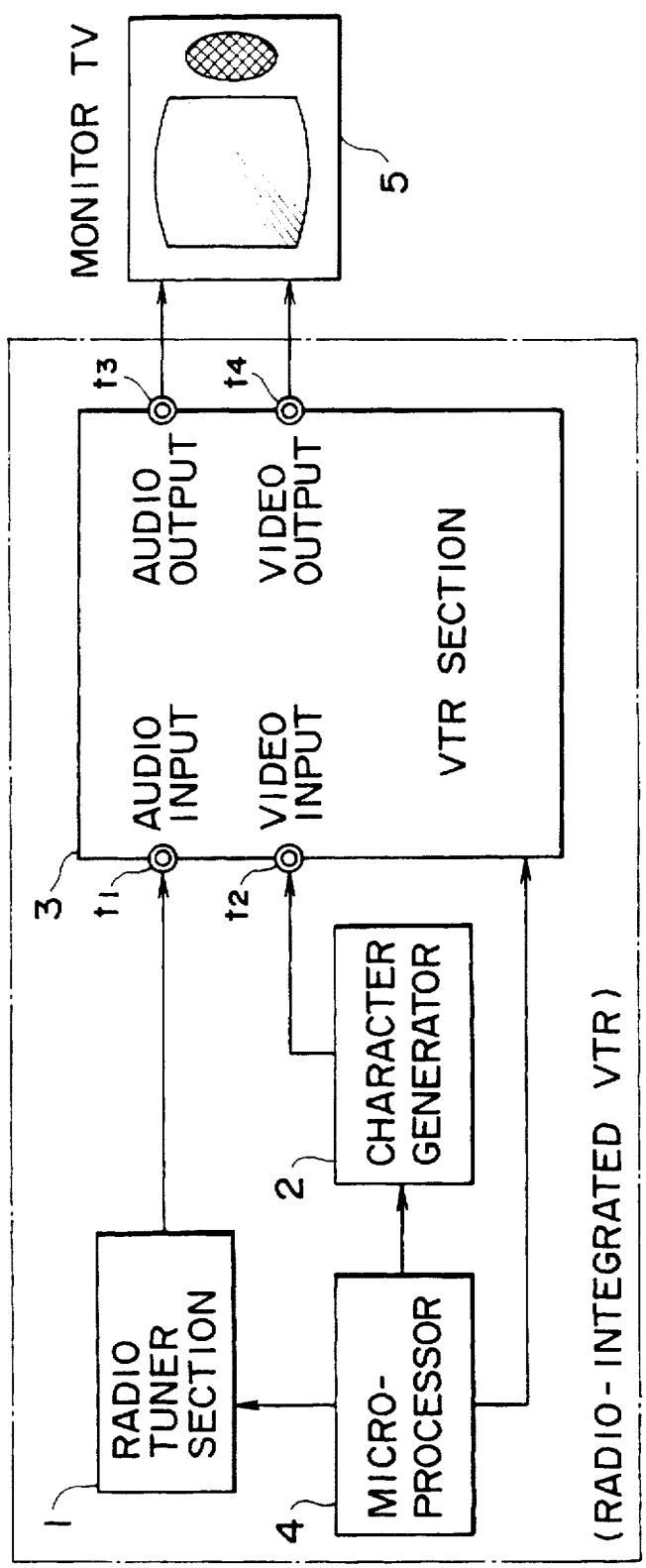
FIG. IA

FIG. IB
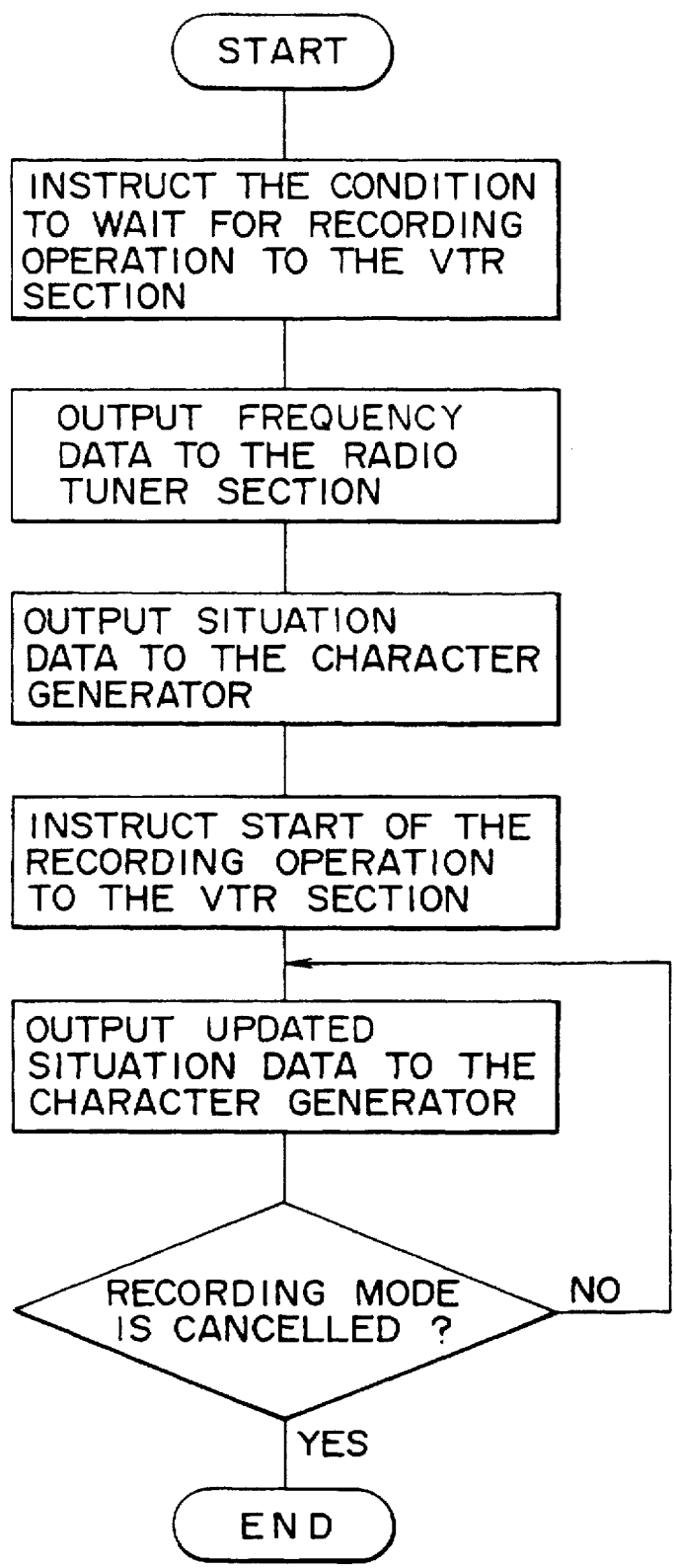

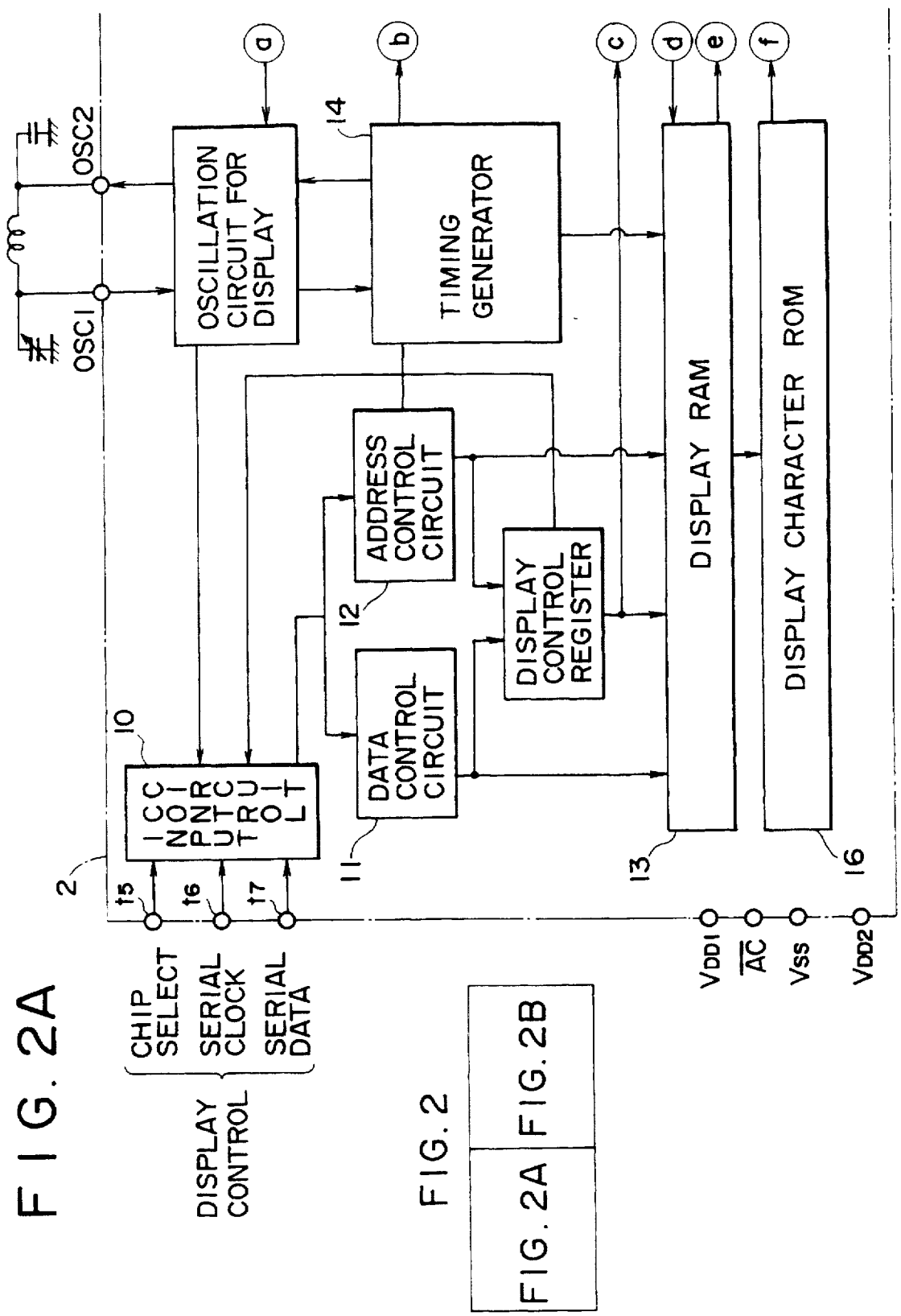

5,787,226

RADIO-INTEGRATED VIDEO TAPE RECORDER (VTR)

BACKGROUND OF THE INVENTION

1. Field of the Invention

The present invention relates to a radio-integrated video tape recorded (VTR) comprising a function for receiving radio broadcast programs.

2. Description of the Related Art

A video tape recorder (VTR) can record both video signal and audio signal for a longer period, for example, six (6) hours when these signals are recorded on a 120-minute video tape in the triple speed recording mode. Therefore, such recording method is often employed for recording an FM broadcast program for a longer time or a daily English conversation program of 15 minutes a day for a month all on the same tape. Usually, as shown in FIG. 4, a radio broadcast program has been recorded by connecting an audio output of a radio receiver 30 to an audio input terminal of a VTR 31 and then setting the VTR 31 to the recording mode. Even in the case of a radio-integrated VTR, recording has been realized by only supplying an audio output of a radio tuner section to the VTR and then setting the VTR to the recording mode.

However, according to the related art as explained above, since only an audio signal is recorded, it is not easy to retrieve the desired programs or recording points after the recording. That is, in the case of retrieving TV broadcast programs, cuing of a program can be realized through observation of a program displayed on the display screen using the cue or review function, but in the case of retrieving the radio broadcast programs not accompanied by a video signal, no video signal is displayed when the cue or review function is activated. Therefore, the only way to effect retrieval is to reproduce an audio signal in the normal speed reproducing mode even when the recording time is very long.

SUMMARY OF THE INVENTION

It is therefore an object of the invention to provide a radio-integrated VTR which ensures easier retrieval of the recorded radio broadcast programs.

According to one aspect of the present invention, for achieving the above-mentioned object, a radio-integrated VTR comprises a radio tuner section for receiving a radio broadcast program and which outputs a corresponding received audio signal, a character generator for producing a video signal based on received situation data and then outputting such video signal, a VTR section for recording the output audio signal from the radio tuner section and the output video signal from the character generator, and a microprocessor for controlling respective operations of the radio tuner, character generator and VTR section and to output the situation data from the character generator for recording on the video signal in the radio broadcast recording mode.

According to another aspect of the present invention, the situation data outputted during the recording operation includes time data and receiving data. Such receiving data includes a receiving frequency and/or a broadcasting station name.

According to another aspect of the present invention, the character generator comprises means for designating a background color of characters and numerals represented by the video signal and means for superimposing a synchronous signal on the video signal designating the characters and numerals and the background color so as to provide a composite video signal for recording.

According to still another aspect of the present invention, when the radio broadcast program recording mode is selected, the VTR section is set in a condition waiting for the recording operation, the radio tuner section is set to the receiving condition and the VTR section is set to the recording condition after a composite video signal is outputted from the synchronous signal superimposing means of the character generator.

In the reproducing mode, since the situation data (for example, time data and receiving data) outputted by the microprocessor and included in the recorded video signal during the recording operation is displayed on the screen, the desired program or recording point can be retrieved by observing such situation data. Moreover, the more effective retrieval can also be realized by utilizing the cue and review functions.

BRIEF DESCRIPTION OF THE DRAWINGS

FIG. 1A is a schematic circuit block diagram of a radio-integrated VTR according to an embodiment of the present invention.

FIG. 1B is a flowchart to which reference will be made in explaining the radio broadcast program recording operation of the radio-integrated VTR of FIG. 1A.

FIGS. 2A and 2B, taken together, comprise a circuit block diagram of the character generator included in the radio-integrated VTR of FIG. 1A.

DESCRIPTION OF THE PREFERRED EMBODIMENT

Figure 2B:
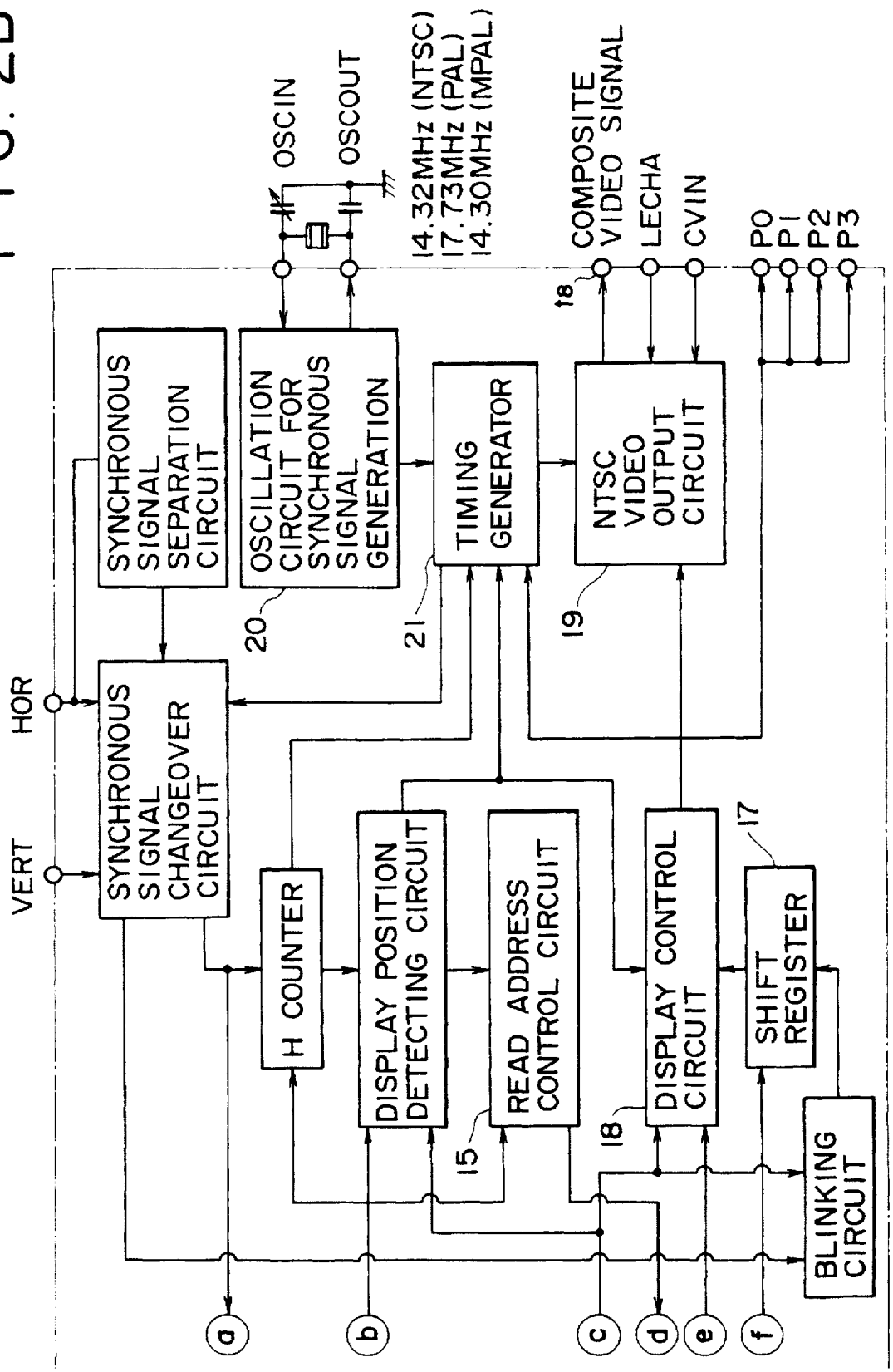

A preferred embodiment of the present invention will be explained with reference to FIGS. 1A, 1B, 2A, 2B and 3 of the accompanying drawings. In FIG. 1A, a radio tuner section 1 inputs broadcast signals received by an antenna not illustrated and then picks up a signal of a selected frequency from the received signals. The selected frequency is varied on the basis of a selection control signal of a microprocessor 4. An audio signal thus received is supplied to an audio input terminal $t_1$ of a VTR section 3.

A character generator 2 receives a display control signal from the microprocessor 4 and generates a composite video display signal corresponding to the display control signal from the microprocessor 4. This composite video display signal is supplied to the video input terminal $t_2$ of the VTR section 3. A particular arrangement of the character generator 2 will be explained hereunder.

The VTR section 3, in a recording mode, converts an input audio signal and an input composite video display signal to signals for recording and records these converted signals on related portions of a video tape. In a reproducing mode, the VTR section 3 reproduces the signals recorded on the video tape to recover the signals of the original signal bands and then outputs the audio signal from the audio output terminal $t_3$ and the video signal from the video output terminal $t_4$, respectively. The audio output terminal $t_3$ and the video output terminal $t_4$ are connected respectively to audio and video input terminals, respectively, of a monitor TV 5. Moreover, the VTR section 3 is controlled by drive control signals from the microprocessor 4 to execute various operations for reproduction, recording, fast feeding and rewinding, etc.

On the basis of an operation command inputted by an operator, the microprocessor 4 outputs control signals to the radio tuner section 1, character generator 1 and VTR section 3, etc. as explained above. In addition, the microprocessor 4 comprises a timer and has an internal memory for storing font address data and correspondence table and color data, etc. The display control signal or situation data sent to the character generator 2 contains a display position address and display data. When the radio broadcast program recording mode is selected, time data and receiving data and also background color data are outputted as part of the situation data supplied to the character generator 2 during execution of the flowchart shown in FIG. 1B. In this embodiment, the time data include "Month", "Date", "Day" and "Time", while the receiving data includes "Receiving band" and "Receiving frequency", but these contents may be changed as required. For instance, "Year" may be displayed or "Day" may be deleted as the time data. Moreover, as the receiving data, "Receiving frequency" may be replaced by a "Broadcasting station name" and both "Receiving frequency" and "Broadcasting station name" can be displayed.

FIGS. 2A and 2B together show a circuit block diagram of the character generator 2. In FIG. 2A, the display control signal from the microprocessor 4 is actually shown to comprise a chip select signal, a serial clock signal and a serial data signal. Such serial data signal includes display position data, display data and background color data as explained above. These chip select, serial clock and serial data signals are supplied to an input control circuit 10 through the input terminals $t_5$ to $t_7$. The input control circuit 10 fetches the data only during the L level period of the chip select signal and then outputs the display data and background color data to a data control circuit 11 and the display position address to an address control circuit 12, respectively. The display data is stored in an address of a display RAM 13 based on a write address from the address control circuit 12. That is, the display data is stored in the address corresponding to the display position on the display screen. Moreover, the background color data is also stored in the display RAM 13.

The display RAM 13 outputs the display data to a display character ROM 16 based on a read address from a read address control circuit 15 (FIG. 2B). The display character ROM 16 (FIG. 2A) outputs the font data (video data of character and numeral) corresponding to the display data (font address) to a shift register 17 (FIG. 2B). The shift register 17 outputs the font data to a display control circuit 18 at the time for the display on the display screen, while the display RAM 13 outputs the background color data to a display control circuit 18 at the time for the display on the display screen. The display control circuit 18 generates a video signal by mixing the font data and background color data and then outputs this video signal to an NTSC video output circuit 19.

On the other hand, an oscillation circuit 20 for generating a synchronous signal outputs an original clock signal to a timing generator 21 and the timing generator 21 generates internal synchronous signals (horizontal synchronous signal and vertical synchronous signal) from the original clock signal and outputs these synchronous signals to the NTSC video output circuit 19. The NTSC video output circuit 19 superimposes the internal synchronous signals on the video signal from the display control circuit 18 to generate a composite video signal. This composite video signal is supplied to the video input terminal $t_2$ of the VTR section 3 via an output terminal $t_8$.

Next, operations of the circuit arrangement described above with reference to FIG. 1A will be explained. When the radio broadcast program recording mode is selected, the microprocessor 4 executes the operations shown in the flowchart of FIG. 1B. Namely, the microprocessor 4 outputs a drive control signal to the VTR section 3 to set this section to the condition waiting for the start of recording operation. Next, the microprocessor 4 outputs a band selection control signal to the radio tuner section 1 to set this section to the radio broadcast (frequency) receiving condition. The microprocessor 4 also outputs a display control signal to the character generator 2, causing it to output a composite video signal including the situation data during the recording operation as the display data. Next, the microprocessor 4 outputs a drive control signal to the VTR section 3 to set this section to the recording mode. Thereby, an audio signal of the radio broadcast program and a video signal representing the display data including the situation data during the recording operation are recorded on the video tape. The character generator 2 sequentially outputs data until the recording mode is cancelled or terminated and continuously updates the situation data (current time) during the recording operation.

Figure 3:
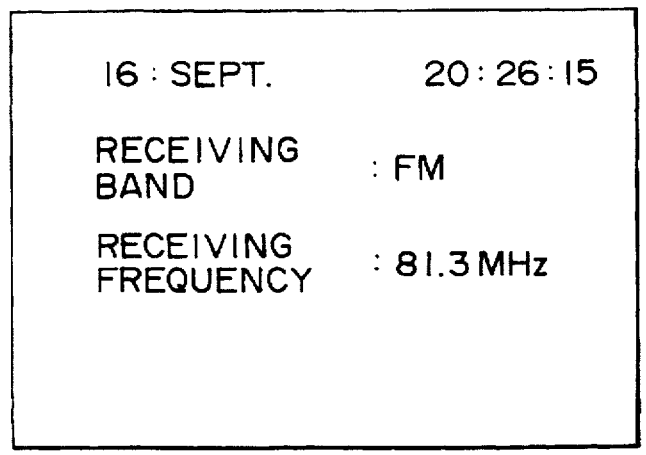
FIG. 3 illustrates an example of the video signal reproduced on the display screen when reproducing an audio signal recorded with a VTR in accordance with the present invention.
Figure 4:
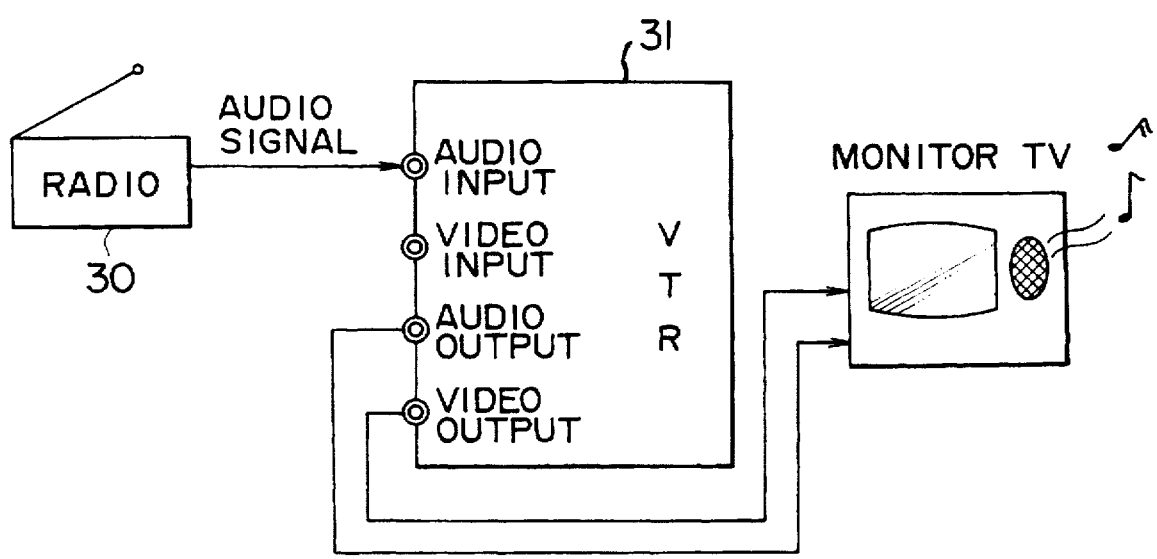
FIG. 4 is a schematic diagram showing an arrangement used in the prior art for recording a radio broadcast program with a VTR.

When the video tape which has been recorded as explained above is replayed, the situation data (time data, receiving data) during the recording operation as shown FIG. 3 are displayed on the screen while the recorded audio is reproduced. Therefore, the desired recorded program or recording point can easily be found by observing such situation data or listening to the reproduced voice or other audio by utilizing the fast feeding and rewinding functions. Moreover, retrieval can be achieved more effectively because it is possible to retrieve the video tape while observing the situation data during the recording operation displayed on the display screen by utilizing the cue and review functions.

Here, since the character generator 2 can designate the background color during display of characters and numerals, it is possible to record radio programs by changing the background colors for the respective days of the week when the recording is effected. For instance, in the case where the English conversation program of 15 minutes a day is recorded continuously for a month, the quick cuing is possible by effecting the fast feeding and rewinding functions while the operator observes the colors displayed on the screen.

As explained above, the present invention provides an excellent effect in that the recorded radio broadcast programs can be retrieved easily because the situation data (time and receiving data) during the recording operation are recorded as the video signal for the recording of a radio broadcast program.

What is claimed is:

1. A radio-integrated video tape recorder (VTR) comprising:
   a radio tuner section for receiving radio broadcast programs and for outputting an audio signal corresponding to a selected one of said radio broadcast programs in a radio broadcast program recording mode;
   a character generator for producing a video signal;
   a VTR section operative, in said radio broadcast program recording mode, for recording said audio signal output by said radio tuner section and said video signal from said character generator in related portions of a recording tape, said VTR section being further operative, in a playback mode, for substantially simultaneously reproducing said audio and video signals recorded in said related portions of the tape; and a microprocessor for controlling said radio tuner section, character generator and VTR section and being operative, in said radio broadcast program recording mode, to provide situation data to said character generator which determines said video signal recorded by said VTR section and which includes time data and receiving data identifying said one of the radio broadcast programs to which said audio signal recorded in said related portion of the recording tape corresponds so that, in said playback mode, said video signal being reproduced from the tape can be referred to in retrieving said selected one of the radio broadcast programs recorded on the tape.

2. A radio-integrated VTR according to claim 1, wherein said receiving data includes a receiving frequency.

3. A radio-integrated VTR according to claim 1, wherein said receiving data includes a radio broadcasting station name.

4. A radio-integrated VTR according to claim 1, wherein said video signal represents characters and numerals of display data, and said character generator comprises means for designating background colors of said characters and numerals in said video signal.

5. A radio-integrated VTR according to claim 4, wherein said character generator comprises means for superimposing a synchronous signal on said video signal so as to constitute a composite video signal.

6. A radio-integrated VTR according to claim 5, wherein said microprocessor is programed so that, when the radio broadcast program recording mode is selected, said VTR section is set in a condition for awaiting a recording operation, said radio tuner section is set in a receiving condition and said VTR section is actuated to effect said recording operation after said composite video signal is outputted from said means for superimposing synchronous signal on said video signal.

* * * * *